US011640450B2

(12) United States Patent
Hazan

(10) Patent No.: US 11,640,450 B2
(45) Date of Patent: May 2, 2023

(54) AUTHENTICATION USING FEATURES EXTRACTED BASED ON CURSOR LOCATIONS

(71) Applicant: International Business Machines Corporation, Armonk, NY (US)

(72) Inventor: Itay Hazan, Beer Sheva (IL)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 16/101,460

(22) Filed: Aug. 12, 2018

(65) Prior Publication Data

US 2020/0050744 A1   Feb. 13, 2020

(51) Int. Cl.
*G06F 21/31* (2013.01)
*G06N 7/00* (2006.01)
*G06N 20/00* (2019.01)

(52) U.S. Cl.
CPC ............ *G06F 21/316* (2013.01); *G06N 7/00* (2013.01); *G06N 20/00* (2019.01)

(58) Field of Classification Search
CPC ....... G06F 21/316; G06F 21/31; G06N 20/00; G06N 7/00
See application file for complete search history.

(56) References Cited

U.S. PATENT DOCUMENTS

| | | | |
|---|---|---|---|
| 3,531,796 A | 9/1970 | Kiesling | |
| 6,442,692 B1 | 8/2002 | Zilberman | |
| 7,701,364 B1 | 4/2010 | Zilberman | |
| 7,706,574 B1 | 4/2010 | Ross | |
| 7,908,645 B2* | 3/2011 | Varghese | G06F 21/552 726/4 |
| 8,134,449 B2 | 3/2012 | Wu, Jr. et al. | |
| 8,332,932 B2* | 12/2012 | Kellas-Dicks | G06F 21/32 713/186 |
| 8,489,635 B1* | 7/2013 | Phoha | G06F 21/316 713/184 |
| 8,856,955 B2 | 10/2014 | Hinds et al. | |
| 9,268,927 B1 | 2/2016 | Phoha et al. | |
| 9,396,331 B2* | 7/2016 | Eisen | G06F 21/32 |

(Continued)

FOREIGN PATENT DOCUMENTS

| | | |
|---|---|---|
| EP | 2477136 A1 | 1/2012 |
| EP | 2919422 A1 | 2/2015 |

(Continued)

OTHER PUBLICATIONS

M. Pavithra et al, Continuous User Authentication Using Keystroke Dynamics, IJCSIT (Year: 2015).*

(Continued)

*Primary Examiner* — Shanto Abedin
(74) *Attorney, Agent, or Firm* — Barry D. Blount

(57) ABSTRACT

In an example computer-implemented method, a number of cursor locations within a text field, and associated action types and time stamps are received via a processor. One or more features including a latency between a number of events associated with the cursor locations is extracted via the processor based on the cursor locations and the associated action types and time stamps. A user is authenticated, identified, or verified via the processor based on the extracted one or more features and a learning model or a statistical mechanism.

20 Claims, 7 Drawing Sheets

(56) References Cited

U.S. PATENT DOCUMENTS

| | | | |
|---|---|---|---|
| 9,590,978 B2* | 3/2017 | Joyce, III | H04L 9/3247 |
| 9,639,699 B1* | 5/2017 | Kurupati | H04W 12/06 |
| 2004/0034788 A1 | 2/2004 | Ross | |
| 2004/0059950 A1 | 3/2004 | Bender et al. | |
| 2004/0073809 A1* | 4/2004 | Wing Keong | G06F 21/36 726/7 |
| 2006/0020815 A1* | 1/2006 | Varghese | G06F 21/36 713/182 |
| 2006/0114225 A1* | 6/2006 | Tsukada | G06F 3/038 345/157 |
| 2006/0242424 A1 | 10/2006 | Kitchens et al. | |
| 2006/0271790 A1 | 11/2006 | Chen | |
| 2009/0049555 A1 | 2/2009 | Cho et al. | |
| 2009/0150992 A1 | 6/2009 | Kellas-Dicks et al. | |
| 2011/0113388 A1 | 5/2011 | Eisen et al. | |
| 2013/0246383 A1* | 9/2013 | White | G06F 16/9535 707/706 |
| 2013/0263240 A1* | 10/2013 | Moskovitch | H04L 63/08 726/7 |
| 2013/0343616 A1 | 12/2013 | Forero et al. | |
| 2014/0351914 A1 | 11/2014 | Suresh et al. | |
| 2017/0061139 A1* | 3/2017 | Hu | G06F 3/0488 |

FOREIGN PATENT DOCUMENTS

| | | |
|---|---|---|
| GB | 2470579 A | 12/2010 |
| WO | 2013006071 A1 | 1/2013 |

OTHER PUBLICATIONS

Machine translation of Chinese patent application No. CN 103699216 A, Wei Qing-guo et al (Year: 2014).*

Yu Zhong et al, Keystroke Dynamics for User Authentication, IEEE (Year: 2012).*

Roy A. Maxion et al, Keystroke Biometrics with Number-Pad Input, IEEE (Year: 2010).*

Pavithra et al., "Continuous User Authentication Using Keystroke Dynamics", International Journal of Computer Science and Information Technologies, vol. 6, No. 2, 2015, India, pp. 1922-1925.

Patil et al., "Keystroke Dynamics for User Authentication and Identification by using Typing Rhythm", International Journal of Computer Applications, vol. 144, No. 9, Jun. 2016, India, 7 pages.

* cited by examiner

US 11,640,450 B2

AUTHENTICATION USING FEATURES EXTRACTED BASED ON CURSOR LOCATIONS

BACKGROUND

The present techniques relate to authentication and verification. More specifically, the techniques relate to authenticating or verifying users through text cursors.

SUMMARY

According to an embodiment described herein, a system can include processor to receive a session of cursor locations within a text field and associated action types and time stamps. The processor can also further extract one or more features including a latency between a plurality of events associated with the cursor locations based on the cursor locations and the associated action types and time stamps. The processor can also authenticate, identify, or verify a user based on the one or more extracted features and a learning model or a statistical mechanism.

According to another embodiment described herein, a method can include receiving, via a processor, a plurality of cursor locations within a text field and associated action types and time stamps. The method can further include extracting, via the processor, one or more features including a latency between a plurality of events associated with the cursor locations based on the cursor locations and the associated action types and time stamps. The method can also further include authenticating, identifying, or verifying, via the processor, a user based on the one or more extracted features and a learning model or a statistical mechanism.

According to another embodiment described herein, a computer program product can include computer-readable storage medium having program code embodied therewith. The computer readable storage medium is not a transitory signal per se. The program code executable by a processor to cause the processor to receive a plurality of cursor locations within a text field and associated action types and associated time stamps. The program code can also cause the processor to extract one or more features including a latency between a plurality of events associated with the cursor locations based on the plurality of cursor locations and associated action types and associated time stamps. The program code can also cause the processor to authenticate, identify, or verify a user based on the one or more extracted features and a learning model or a statistical mechanism.

DETAILED DESCRIPTION

Figure 1:
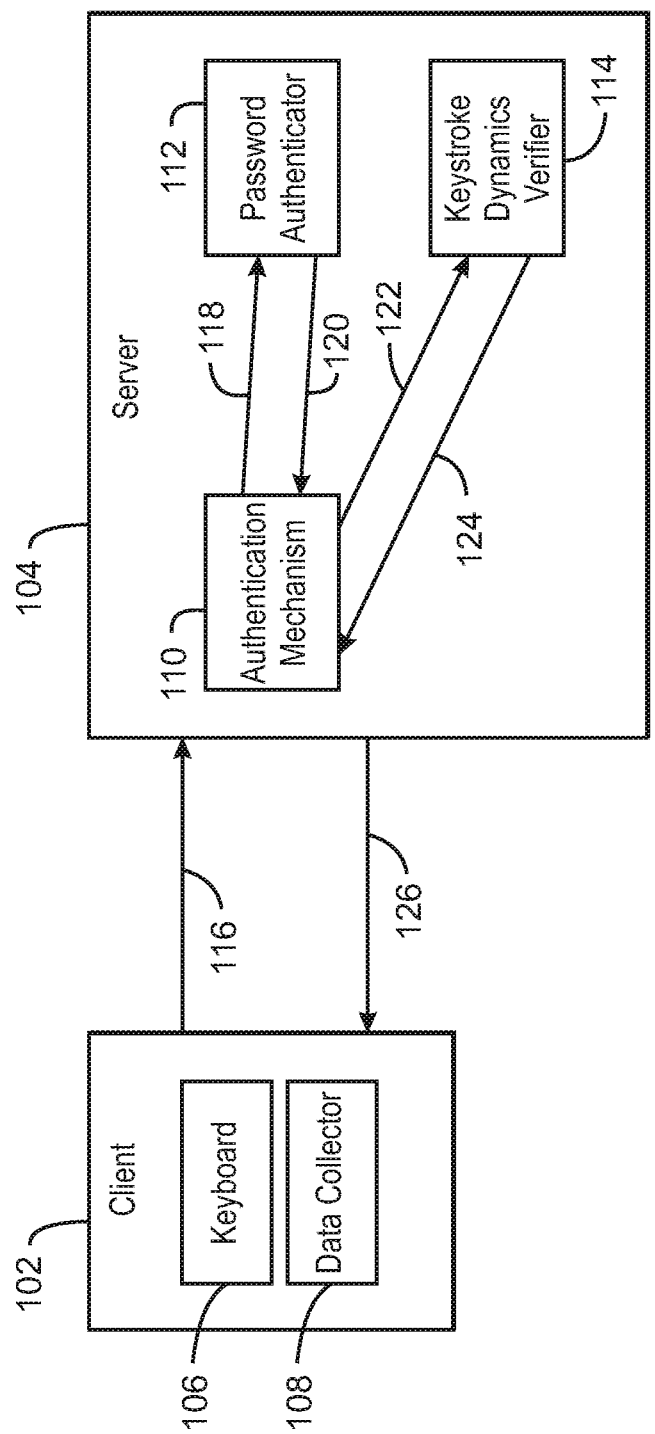
FIG. 1 is a block diagram of an example system for authenticating users using features extracted based on keystrokes events with cursor locations instead of key codes.

Keystroke dynamics can be used as biometric identifiers. For example, a user's key typing can be collected using event loggers. The event loggers can collect events containing key codes corresponding to the keys that were pressed on a keyboard. Descriptive features can then be extracted from the events and inserted into any machine learning, anomaly detection, rule-based or distance-based algorithm. However, documenting key events and then sending them out from the endpoint can expose key codes to credential theft. For example, the key codes may correspond to a password for an application. Such theft can be performed in many places over the chain once the user is done typing. For example, such theft can take place while the client sends keystroke events including key codes to the server or when the service provider shares a session with a specialized keystrokes dynamics validation third party through man in the middle (MITM) attack or session hijacking. In another example, such theft can take place while the events are stored in a database and are vulnerable to various attacks such as SQL injection. Therefore, the use of key codes, or even the use of a one-to-one obfuscation of key codes, exposes the key codes, and thus credentials, to potential theft.

According to embodiments of the present disclosure, a system can include a processor to receive a session of cursor locations within a text field and associated action types and time stamps. As used herein, a session refers to the time from the first input into a text field or fields until the text field is submitted. The action types of each of a number of events can also be extracted and can indicate whether a keystroke corresponds to a key press or a key release. The processor can then extract features including latencies between a number of events associated with the cursor locations based on the cursor locations and the associated action types and time stamps. The processor can further authenticate, identify, or verify a user based on the extracted features and a learning model or a statistical mechanism. As used herein, a statistical mechanism includes any mechanism predictability model such as a regression or decision tree. Thus, embodiments of the present disclosure allow users to be authenticated based on features extracted from their keystrokes without exposing key codes to potential theft. The keystrokes dynamics can be used for user identification or verification in both static text and free text contexts. Identification, as used herein, refers to determining a particular user from a list of potential users. For example, a username may be used as a basis for user identification. Verification, as used herein, refers to comparing a user behavioral model against a claimed identity with a username. For example, the set of characters may be a password associated with the username. Static text, as used herein, includes text content that is predefined and does not change. For example, static text can include verification of passwords or passphrases. Free text contexts can include verification of e-mail authors or tweets. In either case, the latency between key events is used as the basic blocks of the keystrokes dynamics descriptive features. Moreover, even if the user capitalizes letters, deletes characters, or moves the text cursor with keyboard arrows, the techniques described herein are able to compare valuable descriptive features with those extracted from a training set to authenticate or identify the user.

In some scenarios, the techniques described herein can be implemented in a cloud computing environment. As discussed in more detail below in reference to at least FIGS. 4-6, a computing device configured to authenticate users using features extracted based on cursor locations can be implemented in a cloud computing environment. It is understood in advance that although this disclosure can include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

With reference now to FIG. 1, a block diagram shows an example system for authenticating users using features extracted based on keystrokes events with cursor locations instead of key codes. The example system is generally referred to by the reference number 100. FIG. 1 includes a client 102 and a server 104. The client includes a keyboard 106 and a data collector 108. For example, the data collector can collect data such as keyboard input from the keyboard 106. For example, the keyboard can be a hardware keyboard with keys or a software-based keyboard displayed on a tablet. The server includes an authentication mechanism 110, a password authenticator 112, and a keystroke dynamics verifier 114.

In the example of FIG. 1, the keyboard 106 can be sending a password or phrase to an application (not shown) on the server 104. In some examples, the data collector 108 can monitor and collect cursor locations and associated action types and time stamps. For example, the cursor locations may be integers indicating the location of a text cursor in a text field of the application for entering the password or phrase. The text cursor can be flashing or a steady vertical line or underscore that appears on a screen and indicates to users where text is to be added. In addition, in case of deletion, the cursor can indicate where text is to be deleted. Text cursors help users locate written text and thus improves engagement with the system and application. The text cursor can be moved according to the written or deleted text and can also be moved using arrows on the keyboard 106, a mouse click, or other specific keys on the keyboard 106, such as Home and End. A text cursor can be found in almost every computer-text interaction. For example, text cursors are used in various applications using text, such as text editors, browsers URL lines, search engines, command terminals, etc. In some examples, the text can involve writing credentials and cursor locations may be used to improve the precision of the insertion of a username and password into a corresponding field. In such examples, written characters for passwords may be hidden as asterisks or other symbols to avoid shoulder surfing attacks. However, even in such secure situations, the cursor is shown to the user.

In the example of FIG. 1, the keyboard 106 may thus generate input containing a password or a phrase that can be encrypted or hashed by the data collector 108. The hashed password and keystrokes dynamics can then sent 116 to the server 104 the system 100. As used herein, keystrokes dynamics refers to behavioral characteristics associated with typing. For example, the hashed password and keystrokes dynamics may include keystroke events with cursor data. As used herein, cursor data includes data associated with a text cursor, including a cursor location within a text field, an action type associated with the cursor location, and a time stamp associated with the cursor location. For example, the action type may be a key press or a key release. The authentication mechanism 110 is shown sending a hashed password to the password authenticator 112. The password authenticator 112 can authenticate the hashed password and accordingly approve or deny 120 a password authentication. For example, the password authenticator 112 can approve a password authentication in response to detecting that the hashed password matches a hash in a list of approved hashes. Similarly, the password authenticator 112 can deny the password authentication in response to detecting that the hashed password does not match any of the hashes.

Still referring to FIG. 1, the authentication mechanism 110 can send keystroke events with cursor data 122 including cursor locations within one or more text fields, and associated action types and time stamps, to the keystroke dynamics verifier 114. Unlike the application or the password authenticator 112, keystroke dynamics verifier 114 does not receive any encrypted or hashed passwords or phrases 118 or any key code information. Thus, the keystroke dynamics verifier 114 does not collect information that can be used to determine, for example, usernames or passwords. For example, the mechanism used to collect the information can be a plugin for a web browser, or JavaScript code based monitor in web and in other text field related apps. In some examples, the keystroke dynamics verifier 114 may receive key events based on the collected cursor locations, and associated action types and time stamps. For example, a key event can appear as "(cursor_location, action_type, timestamp)". In some examples, the keystroke dynamics verifier 114 can a feature extractor (not shown) that can combine the events to extract features. For example, a feature may be in the form: (cursor_1, cursor_2, combined_action): $\Delta$timestamp, where $\Delta$timestamp is the amount of time elapse during the events. The keystroke dynamics verifier 114 can then use the features to authenticate, identify, or verify a user. For example, the keystroke dynamics verifier 114 can compare each extracted feature to one or more features extracted based on a training set of keystrokes from the user. In some examples, the extracted features can be input into any machine learning, anomaly detection, rule based or distance based algorithm to identify or verify a user identity. The keystroke dynamics verifier 114 can then accordingly approve or deny 124 a verification of the keystroke dynamics. The authentication mechanism 110 can then perform an authentication, identification, or verification of a user based on the password authentication and the keystroke dynamic verification. The server 104 may then grant access or deny access 126 to the client 102 based on the authentication, identification, or verification.

In one example, a user may be typing in a password into a text field of an application. The cursor locations cursor_1 is located after a first key is pressed or released and cursor_2 located after a second key is pressed or released then can be collected and used to extract features in the form: (cursor_1, cursor_2, combined_action): $\Delta$timestamp. For example, one extracted feature could be (0, 1, pp): 126, where 126 is the time in milliseconds to elapse from press to press of the first written key of a password as entered into a password field. In some examples, a feature can be extracted for each key that is entered into a username and/or password field. The extracted features can then be sent to a machine learning, anomaly detection, rule-based, or distance-based algorithm to authenticate or identify a user. For example, the extracted features may be sent along with one or more other features used to authenticate the user. For example, the one or more other features may include (0, 1, pp):126, (0, 1, pr):91, (1, 2, rr): 201. The machine learning algorithm can be, for example, a support vector machine (SVM), a naive Bayes classifier, or a random forest algorithm. SVMs are supervised learning models with associated learning algorithms that analyze data used for classification and regression analysis. Naive Bayes classifiers are a family of simple "probabilistic classifiers" based on applying Bayes' theorem with strong (naive) independence assumptions between the features. Random forests are an ensemble learning method for classification, regression and other tasks, that operate by constructing a multitude of decision trees at training time and outputting the class that is the mode of the classes (classification) or mean prediction (regression) of the individual trees. Example anomaly detection algorithms include the local outlier factor (LOF) algorithm, the one-class classification, and the Gaussian Mixture Model (GMM) classifier. For example, the LOF algorithm can find anomalous data points by measuring the local deviation of a given data point with respect to its neighbors. One-class classification can be used to identify objects of a specific class amongst all objects, by learning from a training set containing only the objects of that class. The GMM classifier is a supervised learning classification algorithm that can be used to classify a wide variety of N-dimensional signals. Distance-based algorithms can include the use of Manhattan distance, Mahalanobis distance algorithms. For example, the distance between two points in a grid based on a strictly horizontal and/or vertical path as opposed to the diagonal distance. The Manhattan distance is the simple sum of the horizontal and vertical components. The Mahalanobis distance a multi-dimensional generalization of the idea of measuring how many standard deviations away P is from the mean of D. The Mahalanobis distance is zero if P is at the mean of D, and grows as P moves away from the mean along each principal component axis.

A user can thus be authenticated or verified using any of the above methods. For example, a user may be authenticated or verified at least partly on the cursor location information as the user associated with a particular username or password. The collected cursor location information provided for the user authentication thus exposes no key code and is resilient against the various attacked describe above. The only data collected and sent outside the endpoint can be the cursor, an associated timestamp, and an associated action type. Thus, even if exposed, the collected data would not provide any advantage to an attacker except for maybe the understanding the username or password length.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional client devices, or additional resource servers, etc.).

Figure 2:
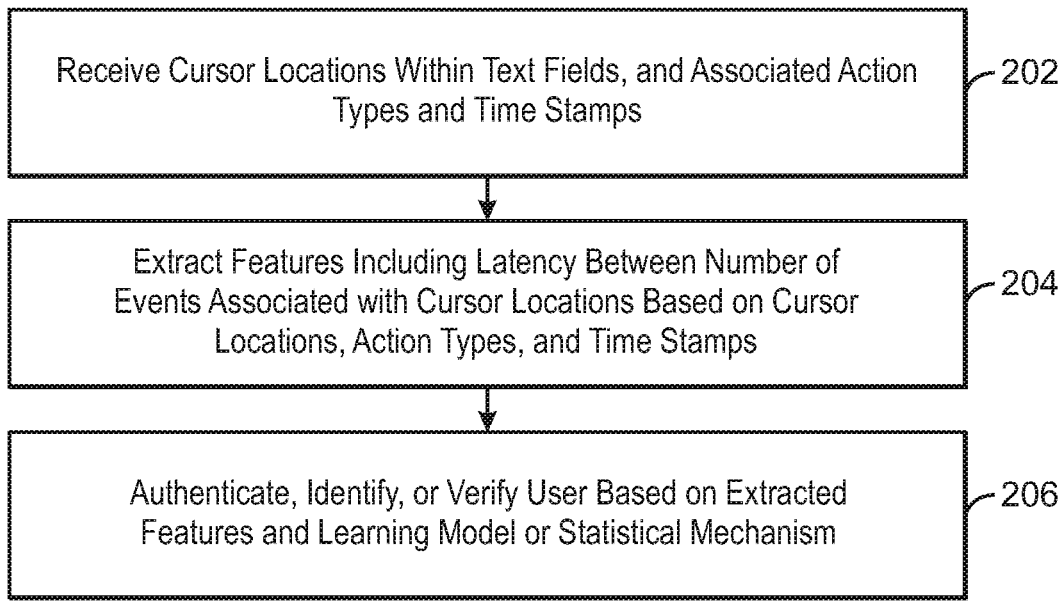
FIG. 2 is a block diagram of an example method that can authenticate users using features extracted based on cursor locations.

FIG. 2 is a process flow diagram of an example method that can authenticate users using features extracted based on cursor locations. The method 200 can be implemented with any suitable computing device, such as the computing device 400 of FIG. 4 or the system 100 of FIG. 1. For example, the methods described below can be implemented by the processor 402 or the processor 702 of FIGS. 4 and 7.

At block 202, a processor receives cursor locations within text fields, and associated action types and time stamps. For example, a user may be entering a username or password into a text field. The cursor locations can be integers representing a location of a cursor at a beginning of an event relative to a field start location in a text field. For example, an event may correspond to a keyboard. A field start location may be the beginning of a text field, such as a username field or a password field.

At block 204, the processor extracts one or more features including a latency between a plurality of events associated with the cursor locations based on the cursor location and the associated action type and time stamp. For example, the feature can be a digraph, a trigraph, or an n-graph. The digraph, the trigraph, or the n-graph can include cursor locations, an action type combination, and a latency of the action type combination at the cursor locations. The feature may be a latency between two consecutive events of an action type combination associated with two or more of the cursor locations. For example, the average latency may be an average amount of time between two or more consecutive key presses, key releases, or any combination thereof. For example, the average latency for key press to key press of a first cursor location to a second cursor location of 126 milliseconds may be represented as (0, 1, pp): 126.

At block 206, the processor authenticates, identifies, or verifies a user based on the extracted one or more features and a learning model or a statistical mechanism. For example, a learning model can include any suitable model that can be trained on training data, data received during normal operation, or both. Examples of learning models include machine learning, anomaly detection, rule-based or distance-based algorithms. The statistical mechanism can include, for example, a confirmatory analysis in which a previously formulated model or models are compared to received data. For example, the processor can compare the extracted feature to one or more features extracted based on a training set of keystrokes from the user. For example, the processor can compare the extracted features using any machine learning, anomaly detection, rule-based, or distance-based algorithm to authenticate, identify, or verify a user. In some examples, such comparison can be performed using a trained neural network. For example, the trained neural network can be a convolutional neural network trained based on one or more types of features including features representing latency between events. The extracted features may be input into the trained convolutional neural network and the result may be a user authentication, user identification, or user verification. For example, a user authentication can include confirming the truth of an attribute of a single piece of data claimed true by an entity. A user identification can include determining a particular user from a list of potential users. For example, a username may be used as a basis for user identification. A user verification can include checking of a set of characters according to the user identity.

The process flow diagram of FIG. 2 is not intended to indicate that the operations of the method 200 are to be executed in any particular order, or that all of the operations of the method 200 are to be included in every case. Additionally, the method 200 can include any suitable number of additional operations. For example, the extracted features can be combined with one or more other features in a feature space and used in any machine learning, anomaly detection, rule-based or distance-based algorithm. The other features may be based on key location or key type, among other characteristics or based on both cursor locations and other information. In some examples, the extracted features can also be used in a higher level features. For example the average, standard deviation, or other aggregating features can be extracted based on the extracted features. In some examples, the processor can also apply dimensionality reduction algorithms such as principal component analysis (PCA), or correlation-based feature selection (CFS) on the extracted features or higher level features. PCA refers to a statistical procedure that uses an orthogonal transformation to convert a set of observations of possibly correlated variables into a set of values of linearly uncorrelated variables called principal components. This transformation can be defined in such a way that the first principal component has the largest possible variance and each succeeding component in turn has the highest variance possible under the constraint that it is orthogonal to the preceding components. The resulting vectors may be an uncorrelated orthogonal basis set. The CFS measure can be used to evaluate a subset of features on the basis of the hypothesis that good feature subsets contain features highly correlated with the classification, yet uncorrelated to each other.

In addition, the method may include receiving a training set of cursor data associated with a user and training a model based on the training set. For example, the training set may be collected by prompting a user to input one or more usernames or passwords. The training set may include cursor locations and associated action types and time stamps. The model can then be trained using the received cursor locations, action types, and time stamps. In some examples, one or more latencies between two or more events inputs can be used to train the model. For example, a varying latency between particular characters input as a username or password may be used to extract one or more features used to train the model. As one example, the third and fourth letters of a username may have an average latency that is greater than the latency between the first and second characters when entered by the user. The resulting extracted features corresponding to these latencies can be used to train the model and later detect suspicious activity based on the model. In some examples, the method 200 can include creating features that are not based on two, three, or any number N consecutive events, but instead on two, three, or any number N non-consecutive events. For example, the method can include creating features based on the time $\Delta$time between cursor_1=0, cursor_2=5.

Figure 3:
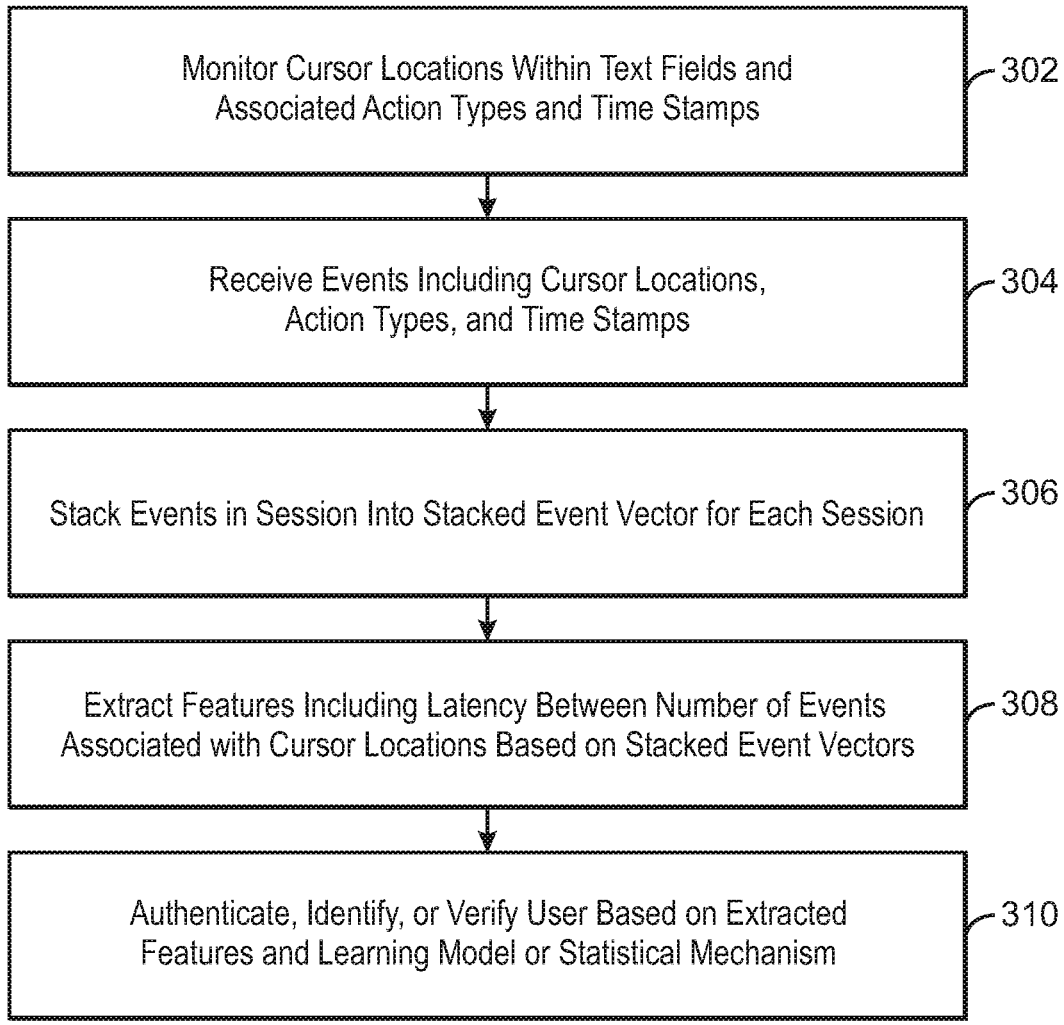
FIG. 3 is a block diagram of an example method that can verify user identity using features extracted based on cursor locations.

FIG. 3 is a process flow diagram of an example method that can verify user identity using features extracted based on cursor locations. The method 300 can be implemented with any suitable computing device, such as the computing device 400 of FIG. 4 or the system 100 of FIG. 1. For example, the methods described below can be implemented by the processor 402 or the processor 702 of FIGS. 4 and 7.

At block 302, a processor monitors keystrokes events with the cursor locations within text fields, associated action types and associated time stamps. For example, the processor can monitor keyboard input into one or text fields of an application that uses text. As one example, the text field may be a field for a username or a password.

At block 304, the processor receives events including the cursor locations, action types, and time stamp. For example, an event may include a cursor location, an action types associated with the cursor location, and a time stamp associated with the action type. In some examples, an event may also include other information such as key location, key type, among other types of information.

At block 306, the processor stacks events in sessions into a stacked event vector for each session. For example, the stacked event vector may take the form: [(cursor_location_1, action_type_1, timestamp_1), ([(cursor_location_2, action_type_2, timestamp_2), . . . ]. A session may include any number of events detected prior to a session submission. For example, the session submission may be a detected clicking of a "submit" button. As one example, a session may include cursor data related to a user entering a user name and password into a user name field and a password field and clicking a "submit" button. In some examples, a session submission may be an expiration of a particular amount of time.

At block 308, the processor extracts features including latency between a number of events associated with the cursor locations based on the stacked event vectors. In some examples, the processor can perform feature engineering. For example, the processor can combine the extracted features with one or more additional features in a feature space. For example, the processor can combine the features from each two (or more) related events of a combined action such that each feature is the delta time of the combination of two consecutive or non-consecutive events (cursor_1, cursor_2, combined_action): Δtimestamp. For example, a combined action may be a key press to key press, a key press to key release, a key release to key release, a key release to key press. In the case of tri-graphs, a combined action can be for example a key press to a key release to a key press.

At block 310, the processor authenticates a user based on the extracted features and a learning model or a statistical mechanism. For example, the learning model may compare the extracted feature to one or more features extracted based on a training set of keystrokes from the user and one or more statistical models. In some examples, the processor can authenticate the user based on one or more combined features.

The process flow diagram of FIG. 3 is not intended to indicate that the operations of the method 300 are to be executed in any particular order, or that all of the operations of the method 300 are to be included in every case. Additionally, the method 300 can include any suitable number of additional operations. For example, the method 300 can also include updating a learning model for the user in response to authenticating the user. In some examples, the combined features in block 308 can also be used in any machine learning, anomaly detection, rule based or distance based algorithm. In some examples, the extracted features can also be used in a higher level feature space. For example the average, standard deviation, or other aggregating features can be extracted based on the extracted features. In some examples, the processor can also apply dimensionality reduction algorithms such as PCA, CFS on the extracted features. The application of dimensionality reduction algorithms can reduce use of memory and improve running time.

Figure 4:
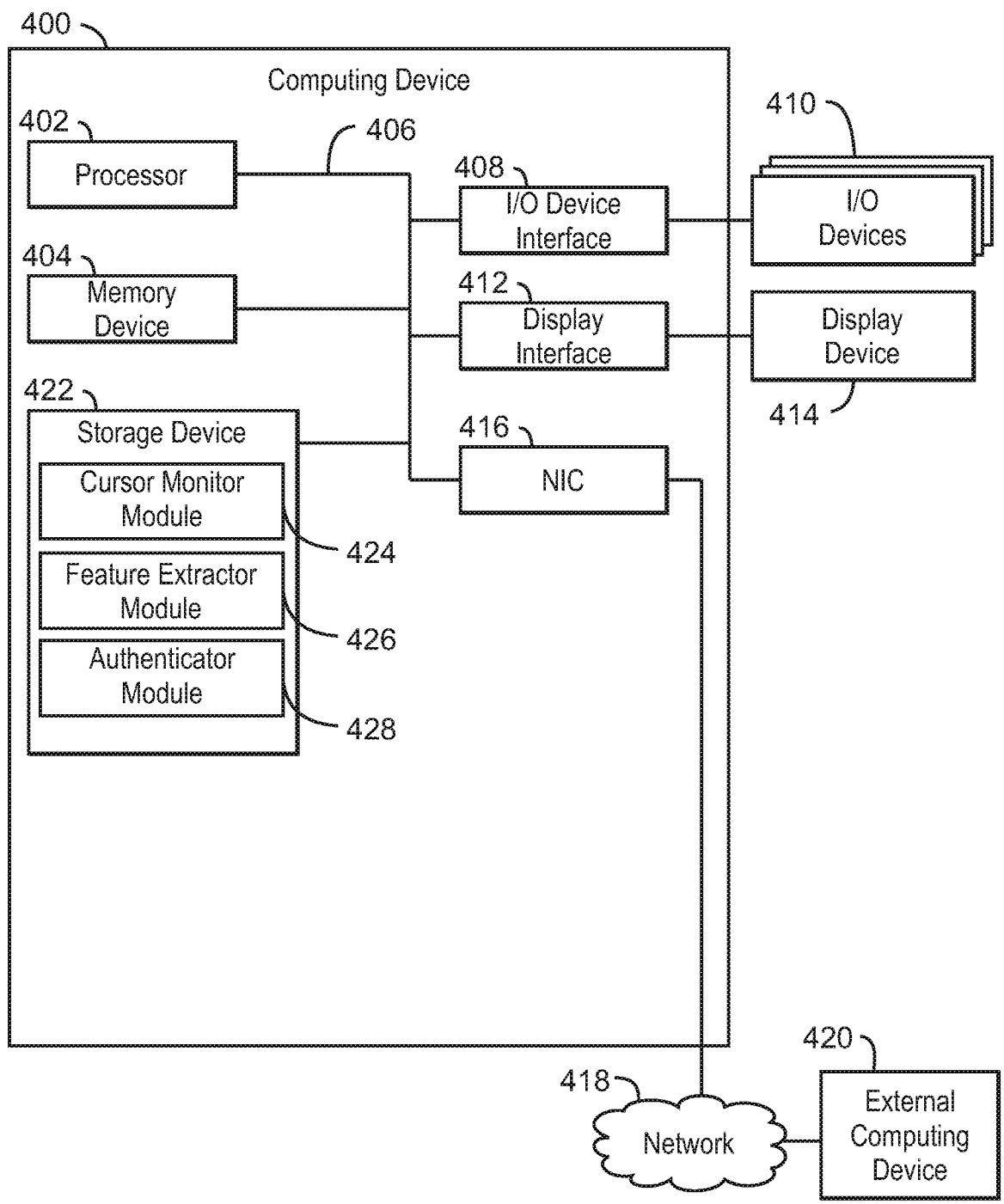
FIG. 4 is a block diagram of an example computing device that can authenticate users using features extracted based on cursor locations.

FIG. 4 is block diagram of an example computing device that can authenticate users using features extracted based on cursor locations. The computing device 400 can be for example, a server, desktop computer, laptop computer, tablet computer, or smartphone. In some examples, computing device 400 can be a cloud computing node. Computing device 400 can be described in the general context of computer system executable instructions, such as program modules, being executed by a computer system. Generally, program modules can include routines, programs, objects, components, logic, data structures, and so on that perform particular tasks or implement particular abstract data types. Computing device 400 can be practiced in distributed cloud computing environments where tasks are performed by remote processing devices that are linked through a communications network. In a distributed cloud computing environment, program modules can be located in both local and remote computer system storage media including memory storage devices.

The computing device 400 can include a processor 402 that is to execute stored instructions, a memory device 404 to provide temporary memory space for operations of said instructions during operation. The processor can be a single-core processor, multi-core processor, computing cluster, or any number of other configurations. The memory 404 can include random access memory (RAM), read only memory, flash memory, or any other suitable memory systems.

The processor 403 can be connected through a system interconnect 406 (e.g., PCI®, PCI-Express®, etc.) to an input/output (I/O) device interface 408 adapted to connect the computing device 400 to one or more I/O devices 410. The I/O devices 410 can include, for example, a keyboard and a pointing device, wherein the pointing device can include a touchpad or a touchscreen, among others. The I/O devices 410 can be built-in components of the computing device 400, or can be devices that are externally connected to the computing device 400.

The processor 402 can also be linked through the system interconnect 406 to a display interface 412 adapted to connect the computing device 400 to a display device 414. The display device 414 can include a display screen that is a built-in component of the computing device 400. The display device 414 can also include a computer monitor, television, or projector, among others, that is externally connected to the computing device 400. In addition, a network interface controller (NIC) 416 can be adapted to connect the computing device 400 through the system interconnect 406 to the network 418. In some embodiments, the NIC 416 can transmit data using any suitable interface or protocol, such as the internet small computer system interface, among others. The network 418 can be a cellular network, a radio network, a wide area network (WAN), a local area network (LAN), or the Internet, among others. An external computing device 420 can connect to the computing device 400 through the network 418. In some examples, external computing device 420 can be an external webserver 420. In some examples, external computing device 420 can be a cloud computing node.

The processor 402 can also be linked through the system interconnect 406 to a storage device 422 that can include a hard drive, an optical drive, a USB flash drive, an array of drives, or any combinations thereof. In some examples, the storage device can include a cursor monitor module 424, a feature extractor module 426, and an authenticator module

428. The cursor monitor module 424 can monitor a text field of an application for the cursor locations, the associated action types and the associated time stamps. The cursor monitor module 424 can receive a session of cursor locations within a text field and associated action types and time stamps. For example, the cursor locations are represented as an integer for location of a cursor at a beginning of an event relative to a field start location. An associated action type may include a key press or a key release. The feature extractor module 426 can receive events including cursor locations, the associated action types, and the associated time stamps. In some examples, the feature extractor module 426 can stack the events in a session into a stacked event vector extract a feature including a latency between a number of events associated with the cursor locations based on the cursor locations and the associated action types and time stamps. For example, the feature may be extracted based on the stacked event vector. The feature can include a digraph, a trigraph, or an n-graph. The digraph, the trigraph, or the n-graph can include a cursor location, an action type combination, and an aggregated latency of the action type combination at the cursor locations but can include more information such as key location on the keyboard and information on the device. For example, the aggregated latency may be the sum or the average latency of the action type combination at the cursor locations. For example, in the case of two consecutive key events, the following action type combinations can be created: press to release (pr), press to press (pp), release to release (rr) and release to press (rp) along with the key code and the delta timestamp elapsed. The different combinations pr, pp, rr, and rp are examples of digraphs that can used to express different combinations of two consecutive events. Two specific consecutive events can be expressed in the form (cursor_1, cursor_2, combined_action): Δtimestamp and set a feature. Likewise, trigraphs can similarly be used to represent the time elapsed between three specific consecutive events and n-graphs can be used to express time elapsed between a number n specific consecutive events. In some examples, higher-level features such as average or total time may be extracted and may include the cursor locations, an action type combination, and other information including a key location, a key type, or a field name. The features can thus be a latency between two or more consecutive events of an action type combination associated with two or more cursor locations. The authenticator module 428 can authenticate, identify, or verify a user based on the extracted feature and a learning model or a statistical mechanism. For example, the authenticator module 428 can compare the extracted feature to one or more features extracted based on a training set of keystrokes from the user.

It is to be understood that the block diagram of FIG. 4 is not intended to indicate that the computing device 400 is to include all of the components shown in FIG. 4. Rather, the computing device 400 can include fewer or additional components not illustrated in FIG. 4 (e.g., additional memory components, embedded controllers, modules, additional network interfaces, etc.). Furthermore, any of the functionalities of the cursor monitor 424, the feature extractor module 426, and the authenticator module 428, can be partially, or entirely, implemented in hardware and/or in the processor 402. For example, the functionality can be implemented with an application specific integrated circuit, logic implemented in an embedded controller, or in logic implemented in the processor 402, among others. In some embodiments, the functionalities of the cursor monitor module 424, the feature extractor module 426, and the authenticator module 428, can be implemented with logic, wherein the logic, as referred to herein, can include any suitable hardware (e.g., a processor, among others), software (e.g., an application, among others), firmware, or any suitable combination of hardware, software, and firmware.

Figure 5:
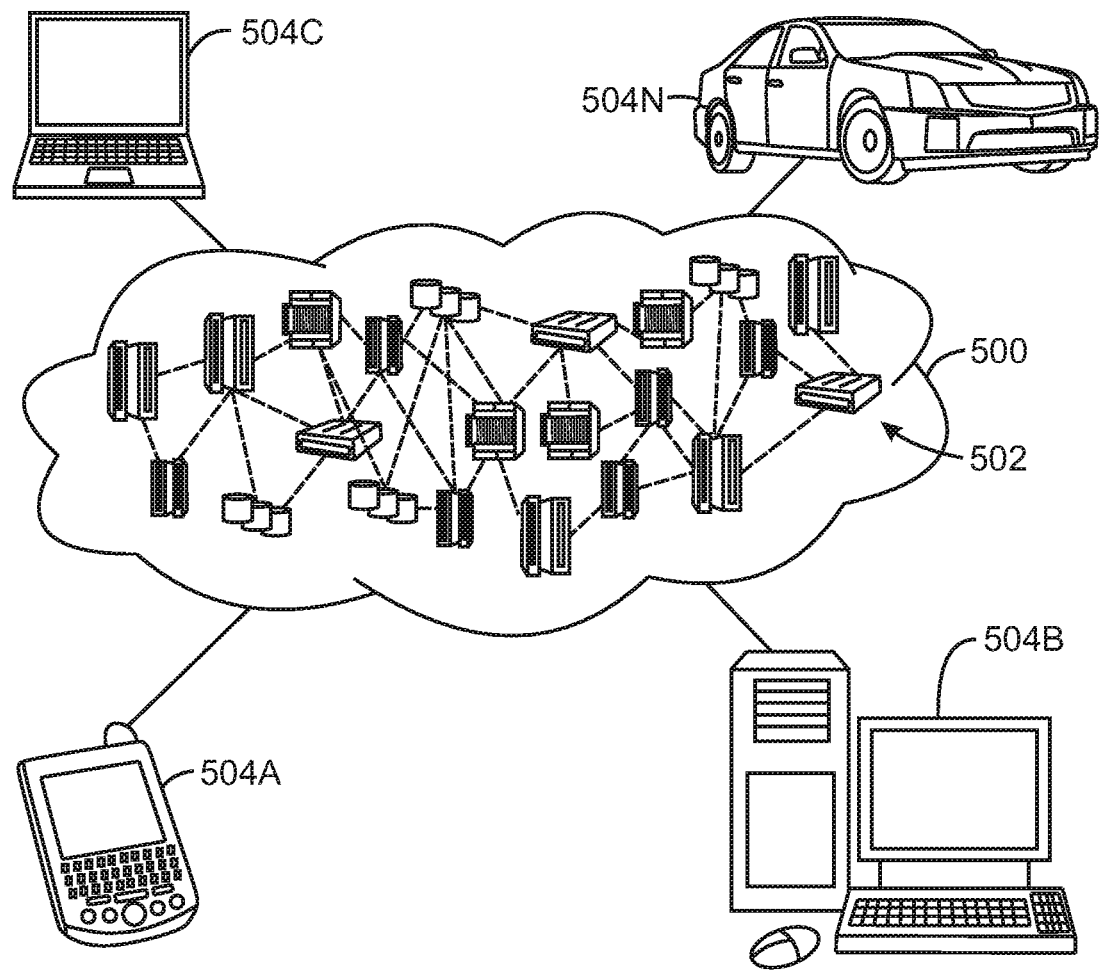
FIG. 5 is a process flow diagram of an example cloud computing environment according to embodiments described herein.

Referring now to FIG. 5, illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N can communicate. Nodes 502 can communicate with one another. They can be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
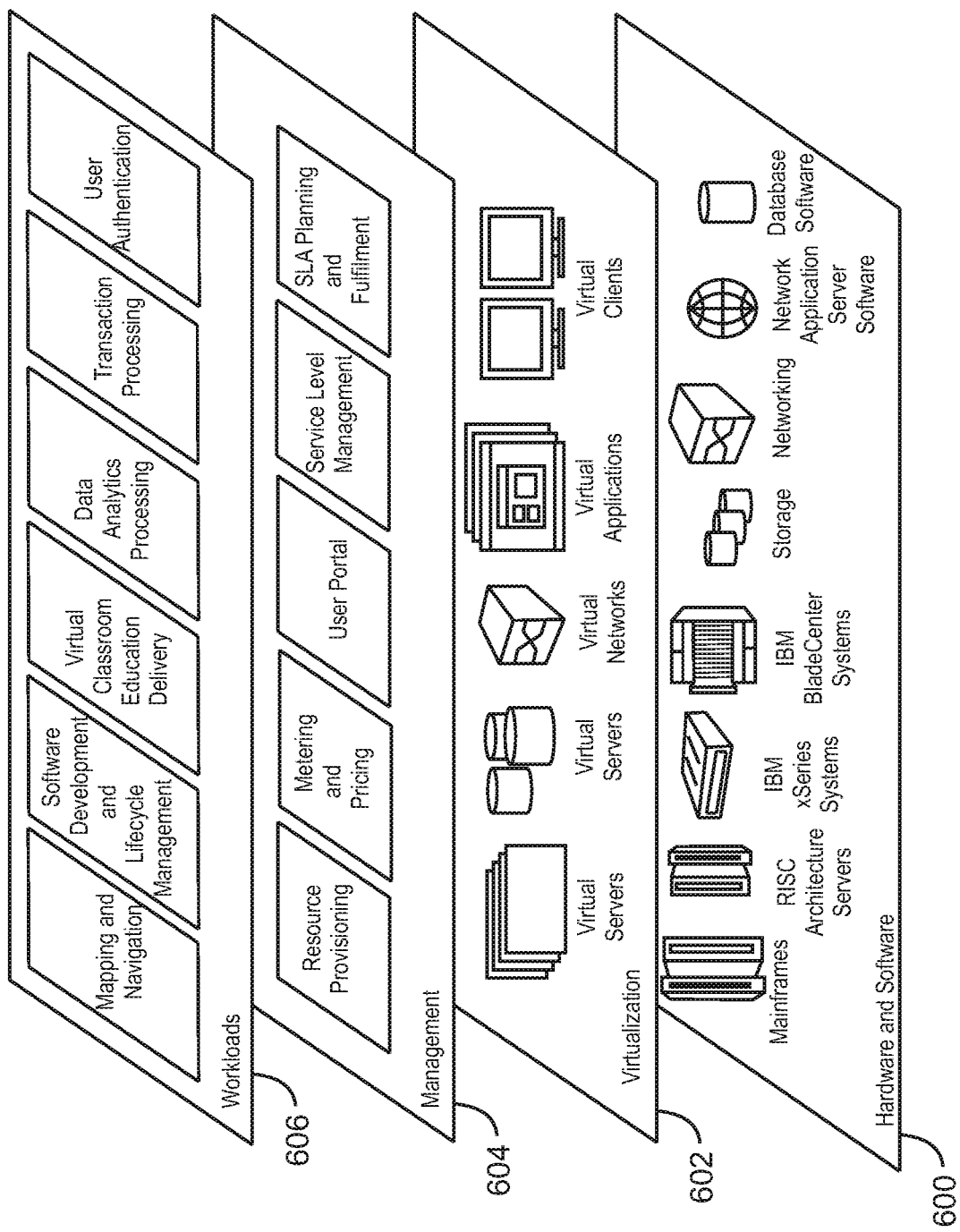
FIG. 6 is a process flow diagram of an example abstraction model layers according to embodiments described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 602 provides an abstraction layer from which the following examples of virtual entities can be provided: virtual servers; virtual storage; virtual networks, including virtual private networks; virtual applications and operating systems; and virtual clients. In one example, management layer 604 can provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment can be utilized. Examples of workloads and functions which can be provided from this layer include: mapping and navigation; software development and lifecycle management; virtual classroom education delivery; data analytics processing; transaction processing; and user authentication.

The present techniques can be a system, a method or computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques can be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
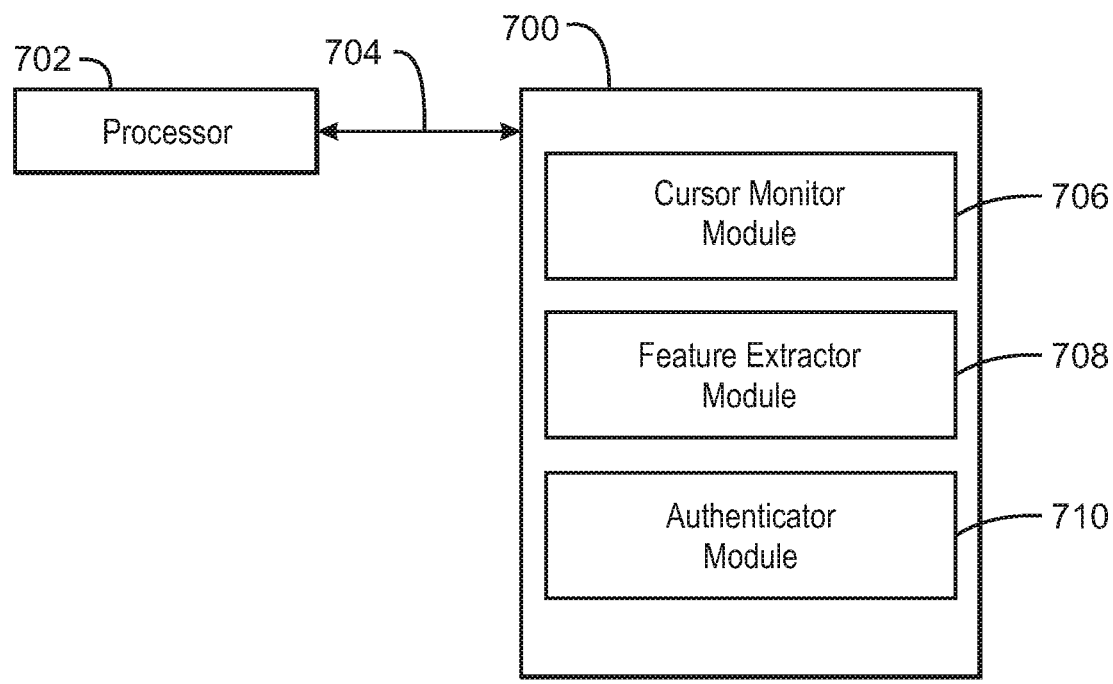
FIG. 7 is an example tangible, non-transitory computer-readable medium that can authenticate users using features extracted based on cursor location.

Referring now to FIG. 7, a block diagram is depicted of an example tangible, non-transitory computer-readable medium 700 that can authenticate users using features extracted based on cursor location. The tangible, non-transitory, computer-readable medium 700 can be accessed by a processor 702 over a computer interconnect 704. Furthermore, the tangible, non-transitory, computer-readable medium 700 can include code to direct the processor 702 to perform the operations of the method 200 and 300 of FIGS. 2 and 3 above.

The various software components discussed herein can be stored on the tangible, non-transitory, computer-readable medium 700, as indicated in FIG. 7. For example, a cursor monitor module 706 includes code to monitor cursor locations, associated action types and associated time stamps.

The cursor monitor module 706 also includes code to receive a plurality of cursor locations within a text field and associated action types and time stamps. In some examples, the cursor monitor module 706 also includes code to collect and integrate additional descriptive information. For example, the additional descriptive information can include key location and key type. A feature extractor module 708 includes code to receive an event including the cursor locations, the action types, and the time stamps. The feature extractor module 708 includes code to extract a feature including a latency between a number of events associated with the cursor locations based on the cursor data. For example, the feature extractor module 708 can include code to stack a plurality of events including the event in a session into a stacked event vector and extract the features based on the stacked event vector. In some examples, the feature extraction module 708 can include code to extract the feature based on two or more related events of a combined action. An authenticator module 710 includes code to authenticate, identify, or verify a user based on the extracted feature and a learning model or a statistical mechanism. For example, the authenticator module 710 includes code to compare the extracted features including the extracted feature in a test to one or more features extracted based on a training set of keystrokes from the user or test the extracted feature against a machine learning model, a rule-based model, an anomaly detection model, or any statistical-based model. It is to be understood that any number of additional software components not shown in FIG. 7 can be included within the tangible, non-transitory, computer-readable medium 700, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 7 can be included within the tangible, non-transitory, computer-readable medium 700, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a hardware processor to:
   receive, from a second hardware processor, a session of a plurality of cursor locations comprising integers representing a number of characters of displacement of a text cursor relative to a field start location within a text field at a beginning of a keyboard event, and associated action types and time stamps, wherein the keyboard event is associated with a keystroke of a key on a keyboard;
   generate a stacked event vector based on the cursor locations, the associated action types, and the associated time stamps in the session;
   extract one or more features comprising a latency between a plurality of events associated with the cursor locations based on the stacked event vector, wherein the one or more features are extracted based on the cursor locations and the associated action types and time stamps; and
   authenticate, identify, or verify a user based on the one or more extracted features and a learning model or a statistical mechanism and send an authentication, identification, or verification to the second hardware processor.

2. The system of claim 1, wherein the one or more features comprise a digraphs, a trigraphs, n-graphs or higher-level features comprising the cursor locations, an action type combination, and other information comprising a key location, a key type, or a field name.

3. The system of claim 2, wherein the hardware processor is to combine the cursor locations, the associated action types, and the associated time stamps into events and stack the events in the session into the stacked event vector.

4. The system of claim 2, wherein the associated action types comprise a key press or a key release.

5. The system of claim 1, wherein the one or more features comprise a latency between two consecutive events of an action type combination associated with two or more of the cursor locations.

6. The system of claim 1, wherein the hardware processor is to monitor the text field of an application for the cursor locations, the associated action types and the associated time stamps.

7. A computer-implemented method, comprising:
   receiving, from a first processor, a plurality of cursor locations comprising integers representing a number of characters of displacement of a text cursor relative to a field start location within a text field at a beginning of a keyboard event, and associated action types and time stamps, wherein the keyboard event is associated with a keystroke of a key on a keyboard;
   generating, via a second processor, a stacked event vector based on the cursor locations, the associated action types, and the associated time stamps in the session;
   extracting, via the second processor, one or more features comprising a latency between a plurality of events associated with the cursor locations based on the stacked event vector, wherein the one or more features are extracted based on the cursor locations and the associated action types and time stamps; and
   authenticating, identifying, or verifying, via the second processor, a user based on the extracted one or more features and a learning model or a statistical mechanism and sending an authentication, identification, or verification to the first processor.

8. The computer-implemented method of claim 7, further comprising monitoring, via the first processor, the cursor locations, the associated action types and the associated time stamps.

9. The computer-implemented method of claim 8, further comprising combining, via the second processor, the cursor locations, the associated action types, and the associated time stamps into an event.

10. The computer-implemented method of claim 7, comprising stacking, via the second processor, a plurality of events in the session into the stacked event vector.

11. The computer-implemented method of claim 7, comprising combining, via the second processor, the extracted one or more features with one or more additional features in a feature space to generate combined features, and authenticating the user based on the combined features and the learning model or the statistical mechanism.

12. The computer-implemented method of claim 7, comprising updating, via the first processor, the learning model for the user in response to authenticating the user.

13. The computer-implemented method of claim 7, wherein authenticating or identifying the user comprises comparing the extracted one or more features to a training set of keystrokes from the user.

14. A computer program product, the computer program product comprising a computer-readable storage medium having program code embodied therewith, the program code executable by a processor to cause the processor to:

receive a plurality of cursor locations comprising integers representing a number of characters of displacement of a text cursor relative to a field start location within a text field at a beginning of a keyboard event, and associated action types and associated time stamps from a second processor, wherein the keyboard event is associated with a keystroke of a key on a keyboard;

generate a stacked event vector based on the cursor locations, the associated action types, and the associated time stamps in the session;

extract one or more features comprising a latency between a plurality of events associated with the cursor locations based on the stacked event vector, wherein the one or more features are extracted based on the plurality of cursor locations and associated action types and associated time stamps; and authenticate, identify, or verify a user based on the stacked event vectors and a learning model or a statistical mechanism and send an authentication, identification, or verification to the second processor.

15. The computer program product of claim 14, further comprising program code executable by the processor to monitor the cursor locations, the associated action types and the associated time stamps, and to collect and integrate additional descriptive information.

16. The computer program product of claim 14, further comprising program code executable by the processor to combine the cursor locations, the associated action types, and the associated time stamps into an event.

17. The computer program product of claim 16, further comprising program code executable by the processor to stack the plurality of events in a session into a stacked event vector and extract the one or more features based on the stacked event vector.

18. The computer program product of claim 14, further comprising program code executable by the processor to extract the one or more features based on two or more related events of a combined action.

19. The computer program product of claim 14, further comprising program code executable by the processor to compare the extracted one or more features in a test to one or more features extracted on a training set of keystrokes from the user or test the extracted features against a machine learning model, a rule-based model, an anomaly detection model, or any statistical-based model.

20. The system of claim 1, wherein the hardware processor is to not receive, from the second hardware processor, any key code information corresponding to the keystroke.

* * * * *